United States Patent
Kweon

(10) Patent No.: US 7,700,208 B2
(45) Date of Patent: Apr. 20, 2010

(54) WATER TRAP DEVICE FOR FUEL CELL VEHICLE

(75) Inventor: Soon Gil Kweon, Seoul (KR)

(73) Assignee: Hyundai Motor Company, Seoul (KR)

( * ) Notice: Subject to any disclaimer, the term of this patent is extended or adjusted under 35 U.S.C. 154(b) by 225 days.

(21) Appl. No.: 12/006,152

(22) Filed: Dec. 31, 2007

(65) Prior Publication Data

US 2009/0023042 A1    Jan. 22, 2009

(30) Foreign Application Priority Data

Jul. 20, 2007    (KR) .................... 10-2007-0072517

(51) Int. Cl.
*H01M 8/00*    (2006.01)
(52) U.S. Cl. ........................................ 429/12
(58) Field of Classification Search .............. 429/12
See application file for complete search history.

(56) References Cited

U.S. PATENT DOCUMENTS 7,041,411 B2    5/2006  Walsh

FOREIGN PATENT DOCUMENTS

| JP | 61-216704 | 9/1986 |
|---|---|---|
| JP | 2006-059549 | 3/2006 |
| KR | 10-2005-0025493 A | 3/2005 |
| KR | 10-2005-0035334 A | 4/2005 |
| KR | 10-2006-0130957 A | 12/2006 |
| KR | 100671681 B1 | 1/2007 |

*Primary Examiner*—Patrick Ryan
*Assistant Examiner*—Thomas H. Parsons
(74) *Attorney, Agent, or Firm*—Edwards Angell Palmer & Dodge LLP; Peter F. Corless

(57) ABSTRACT

The present invention provides a water trap device for a fuel cell vehicle, in which an anode outlet line is formed to penetrate the inside of a upper portion of a water trap and a coolant discharge pipe having a smaller diameter and extending toward the bottom of the water trap is integrally formed, such that residual coolant collected in the water trap is discharged through a coolant discharge pipe to a water trap outlet valve when residual hydrogen in the anode outlet line is discharged to the water trap outlet valve by the Bernoulli principle.

2 Claims, 2 Drawing Sheets

WATER TRAP DEVICE FOR FUEL CELL VEHICLE

CROSS-REFERENCE TO RELATED APPLICATION

This application claims priority under 35 U.S.C. §119(a) on Korean Patent Application No. 10-2007-0072517, filed on Jul. 20, 2007, the entire contents of which are incorporated herein by reference.

BACKGROUND (a) Technical Field

The present invention relates to a water trap device for a fuel cell vehicle. More particularly, the present invention relates to a water trap device for a fuel cell vehicle, which can simultaneously discharge residual hydrogen from a fuel cell stack and residual coolant collected in a water trap.

(b) Background Art

In a fuel cell stack for a fuel cell vehicle, a membrane electrode assembly (MEA) is positioned at the most inner portion, the MEA including a solid polymer electrolyte membrane capable of transporting hydrogen protons, and catalyst layers, i.e., an anode and a cathode, formed on both sides of the electrolyte membrane to allow hydrogen and oxygen react with each other.

Moreover, a gas diffusion layer (GDL) is positioned at the outside of the MEA, i.e., on the surface where the cathode and the anode are positioned, and a separator having flow fields for supplying fuel and exhaust water produced by the reaction is positioned at the outside of the GDL.

Accordingly, an oxidation reaction of hydrogen occurs at the anode of a fuel cell to produce hydrogen ions and electrons, and a reduction reaction of oxygen occurs at the cathode receiving the hydrogen ions and electrons from the anode to produce water.

That is, hydrogen is supplied to the anode (also referred to as an oxidation electrode) and oxygen (air) is supplied to the cathode (also referred to as a reduction electrode). The hydrogen supplied to the anode is decomposed into hydrogen ions (protons, $H^+$) and electrons ($e^-$) by a catalyst of the electrode layer provided on both sides of the electrolyte membrane. At this time, only the hydrogen ions (protons, $H^+$) are transmitted to the cathode through the electrolyte membrane which is a cation exchange membrane and, at the same time, the electrons ($e^-$) are transmitted to the anode through the GDL and the separator, which are conductors.

Accordingly, at the cathode, the hydrogen ions supplied through the electrolyte membrane and the electrons transferred through the separator meet the oxygen in the air supplied to the cathode to cause a reaction to produce water.

Here, electrical energy is generated by the flow of the electrons through an external conducting wire due to the transfer of the hydrogen ions, and heat is additionally generated during the reaction.

Meanwhile, when an insulator which transfers the hydrogen ions to the oxygen supplied to the cathode is in a dry state, not in a wet state, the hydrogen ions are hard to transfer. Accordingly, moisture, i.e., deionized water for humidification is additionally required other than the water produced by the oxygen.

To this end, coolant for cooling and humidification flows in the fuel cell stack. Here, it is necessary to maintain the balance of the coolant so as not to cause a water shortage in the gas (hydrogen and oxygen) supplied to the fuel cell stack.

In general, since the water shortage affects the performance of the fuel cell stack and causes deterioration, the amount of water discharged to the outside of the fuel cell stack is designed to remain constant.

Accordingly, the residual coolant is collected in a water trap and, if the amount of the collected coolant exceeds a predetermined level, the coolant is automatically discharged to the outside. Here, if the residual coolant is not discharged smoothly, it affects the humidification balance, thus deteriorating the performance of the fuel cell stack.

Meanwhile, hydrogen supplied from a hydrogen tank is mixed with unreacted hydrogen discharged through an anode outlet line after the reaction in the fuel cell stack, and the mixed hydrogen is supplied to a hydrogen inlet of the fuel cell stack.

However, if the hydrogen discharged from the anode outlet line is continuously recirculated, the hydrogen density may be reduced. Accordingly, the hydrogen may be designed so as not to be recirculated, being discharged through a hydrogen vent valve and a silencer in accordance with a predetermined control logic.

The structure of a conventional water trap device and the operation of discharging residual coolant using the water trap will be described below.

FIG. 2 is a schematic diagram illustrating a conventional water trap device.

An anode outlet line 10 (hydrogen discharge line) mounted in a dispenser of a fuel cell stack 100 is connected to a hydrogen vent valve 40 and a silencer 50 in turn, and a coolant outlet line 30 of the dispenser of the fuel cell stack is connected to a water trap 20.

Moreover, a moisture removal line 60 for discharging moisture droplets contained in hydrogen to the water trap 20 is connected between the top of the water trap 20 and the anode outlet line 10.

First and second level sensors 70a and 70b are mounted on upper and lower portions of the water trap 20 respectively, and a water trap outlet valve 80 is mounted on a lower portion thereof.

Accordingly, when the first level sensor 70a detects a higher coolant level, the water trap outlet valve 80 is opened to discharge water. On the other hand, when the second level sensor 70b detects a lower coolant level, the water trap outlet valve 80 is closed.

The reason why the coolant is left in an amount that can be detected by the second level sensor 70b is to prevent the hydrogen discharged through the anode outlet line 10 from being discharged to the water trap 20 through the moisture removal line 60 for removing coolant moisture contained in the hydrogen in the anode outlet line 10. Accordingly, the hydrogen discharged through the anode outlet line 10 is transferred to the silencer 50 through the hydrogen vent valve 40.

The conventional water trap device as described above has the following problems:

1) when the coolant left in the water trap is not removed due to a malfunction of the level sensor, it may deteriorate the performance of the fuel cell stack; and 2) since the hydrogen discharged through the anode outlet line has a pressure higher than the normal pressure, it requires the silencer for reducing discharge noise, the two level sensors, the moisture removal line connecting the anode outlet line to the water trap, thus increasing the manufacturing cost.

The information disclosed in this Background section is only for enhancement of understanding of the background of the invention and should not be taken as an acknowledgement or any form of suggestion that this information forms the prior art that is already known to a person skilled in the art.

SUMMARY OF THE INVENTION

The present invention has been made in an effort to solve the above problems, and an object of the present invention is to provide a water trap device for a fuel cell vehicle, in which an anode outlet line is formed to penetrate the inside of a water trap and a coolant discharge pipe having a smaller diameter and extending toward the bottom of the water trap is integrally formed, such that residual coolant collected in the water trap is discharged through a coolant discharge pipe to a water trap outlet valve when residual hydrogen in the anode outlet line is discharged to the water trap outlet valve by the Bernoulli principle.

In one aspect, the present invention provides a water trap device for a fuel cell vehicle, wherein hydrogen discharged from a fuel cell stack and coolant in a water trap are simultaneously discharged by means using a hydrogen flow velocity and a pressure in the water trap.

In a preferred embodiment, the means using the hydrogen flow velocity and the pressure in the water trap includes: an anode outlet line extending from the fuel cell stack and penetrating the inside of a upper portion of the water trap; a water trap outlet valve connected to an end of the anode outlet line; a coolant outlet line extending from the fuel cell stack and connected to an upper portion of the water trap; and a coolant discharge pipe extending from the anode outlet line toward the bottom of the water trap.

Preferably, the coolant discharge pipe has a diameter smaller than that of the anode outlet line.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

Other aspects of the invention are discussed infra.

Figure 1:
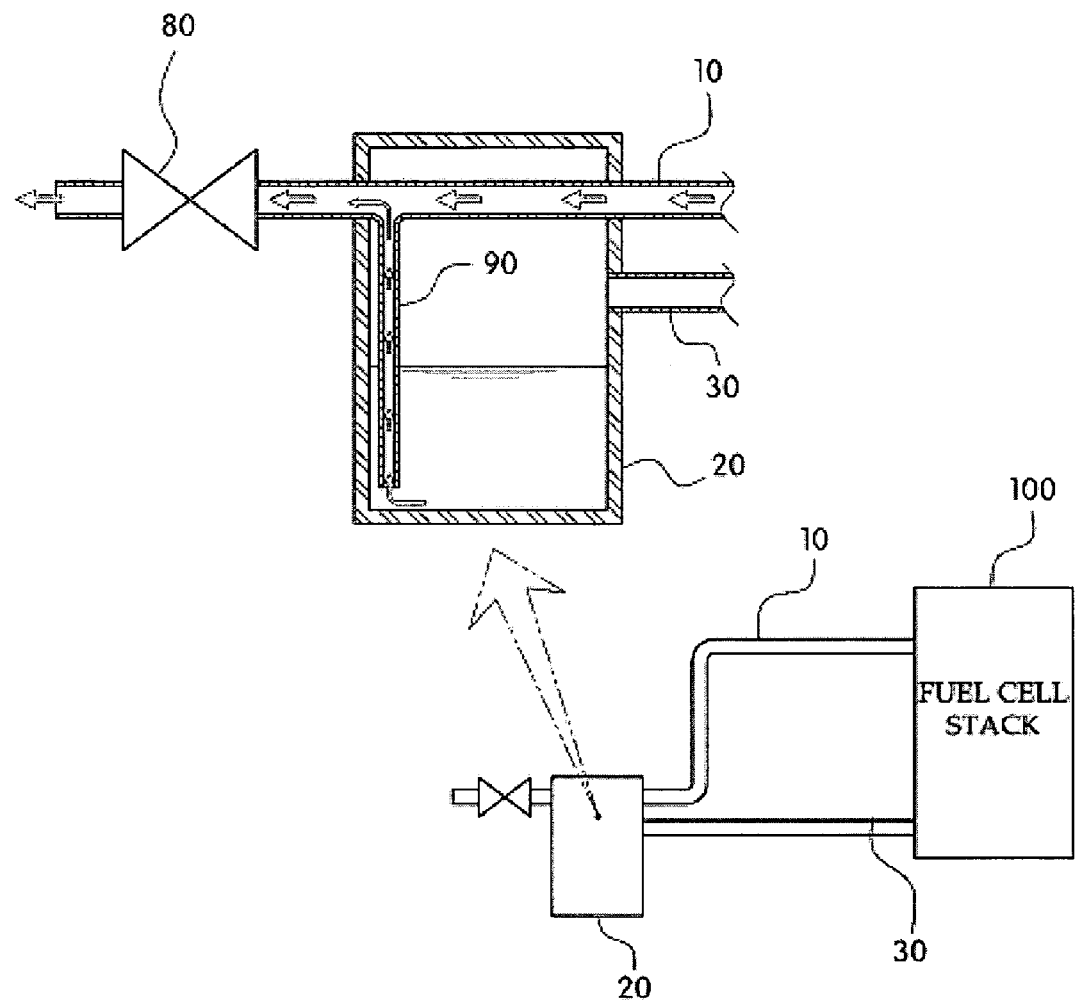
FIG. 1 is a schematic diagram illustrating a water trap device in accordance with the present invention.
Figure 2:
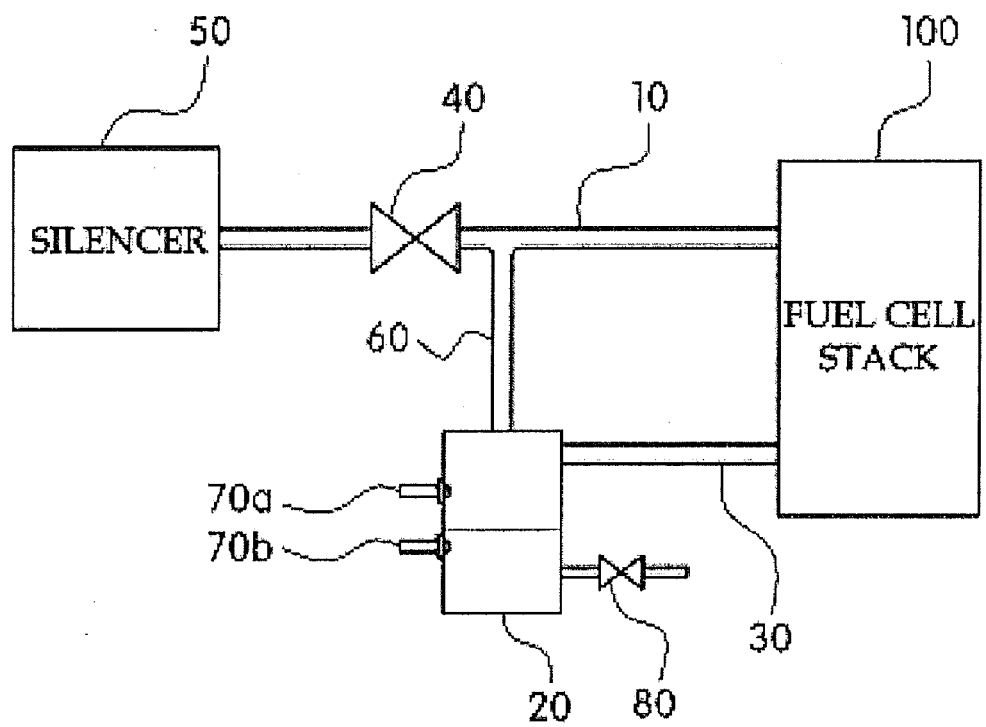
FIG. 2 is a schematic diagram illustrating a conventional water trap device.

Reference numerals set forth in the Drawings includes reference to the following elements as further discussed below:

| | | | |
|---|---|---|---|
| 10: | anode outlet line | 20: | water trap |
| 30: | coolant outlet line | 40: | hydrogen vent valve |
| 50: | silencer | 60: | moisture removal line |
| 70a: | first level sensor | 70b: | second level sensor |
| 80: | water trap outlet valve | 90: | coolant discharge pipe |
| 100: | fuel cell stack | | |

DETAILED DESCRIPTION

Reference will now be made in detail to the preferred embodiment of the present invention, examples of which are illustrated in the drawings attached hereinafter, wherein like reference numerals refer to like elements throughout. The embodiments are described below so as to explain the present invention by referring to the figures.

FIG. 1 is a schematic diagram illustrating a water trap device in accordance with the present invention.

A dispenser for a fuel cell separately supplies moisture and air (oxygen) required for a fuel cell reaction to a fuel cell stack module and includes supply and discharge lines of hydrogen and air disposed therein. One of the supply and discharge lines is an anode outlet line 10.

Hydrogen reacted in a fuel cell stack 100 is discharged through the anode outlet line 10. Unreacted hydrogen discharged through the anode outlet line 10 is recirculated or discharged to the outside air, if hydrogen density is lowered.

In a conventional water trap device, the anode outlet line 10 (hydrogen discharge line) is connected to a hydrogen vent valve 40 and a silencer 50 in turn; however, in the present invention, the hydrogen vent valve 40 and the silencer 50 are excluded, and the anode outlet line 10 penetrates a water trap 20 and is directly connected to a water trap outlet valve 80.

In more detail, as shown in FIG. 1, the anode outlet line 10 extending from the fuel cell stack 100 penetrates the inside of a upper portion of the water trap 20 and is directly connected to the water trap outlet valve 80.

Especially, the anode outlet line 10 passing through the inside of the water trap 20 is connected to a coolant discharge pipe 90 extending toward the bottom of the water trap 20. The coolant discharge pipe 90 has a diameter smaller than that of the anode outlet line 10.

Meanwhile, a coolant outlet line 30 of the dispenser of the fuel cell stack 100 is connected to an upper portion of the water trap 20 such that the coolant discharged from the fuel cell stack through the coolant outlet line 30 is collected in the water trap 20.

Moreover, since the amount of coolant collected in the water trap 20 is proportional to the amount of reacted hydrogen and the hydrogen discharge period is proportional to the amount of reacted hydrogen, the amount of discharged coolant through the hydrogen discharge varies in proportion to the variation of the coolant amount.

The operation of the water trap device with the above-described configuration in accordance with the present invention will be described below.

Residual hydrogen discharged after the reaction in the fuel cell stack 100, i.e., unreacted hydrogen is discharged through the anode outlet line 10, in which the hydrogen passes through a portion of the anode outlet line 10 penetrating the water trap 20 and is discharged to the outside air through the water trap outlet valve 80.

At the same time, the coolant collected in the water trap 20 is absorbed to the coolant discharge pipe 90 extending from the anode outlet line 10 toward the bottom of the water trap 20, and it goes up to be mixed with the hydrogen passing through the anode outlet line 10 and discharged to the outside air through the water trap outlet valve 80.

The reason why the coolant in the water trap 20 can be discharged together with the hydrogen is as follows.

When high-pressure hydrogen is discharged through the anode outlet line 10, if the velocity of the hydrogen fluid is increased, the pressure thereof is reduced by the Bernoulli principle. Moreover, since the coolant discharge pipe 90 is a narrow pipe, the inside of the coolant discharge pipe 90 has a reduced pressure in accordance with the increase in the velocity of the hydrogen fluid.

Accordingly, the pressure in the anode outlet line 10 and the coolant discharge pipe 90 becomes lower than that in the water trap 20 such that the coolant in the water trap 20 is absorbed to the coolant discharge pipe 90 and, at the same time, goes up to be mixed with the hydrogen passing through the anode outlet line 10 and discharged to the outside air through the water trap outlet valve 80.

As the coolant is mixed with the hydrogen discharged through the anode outlet line 10, a noise reduction effect is obtained during hydrogen discharge, and the ignition of discharged hydrogen is remarkably reduced.

Like this, when the hydrogen in the anode outlet line 10 is discharged to the water trap outlet valve 80 by the Bernoulli principle, the coolant in the water trap 20 is discharged along the coolant discharge pipe 90 to the water trap outlet valve 80 simultaneously with the hydrogen. Accordingly, the level sensors for discharging coolant, the hydrogen vent valve for discharging hydrogen, and the silencer in the conventional water trap device are not required, thus reducing the manufacturing cost.

In the event that all coolant is removed from the water trap, there is an effect in which moisture contained in the hydrogen discharged through the anode outlet line is collected in the water trap along the coolant discharge pipe by gravity.

Moreover, in the event that the engine is shut down during a cold start engine operating condition, the water trap outlet valve is opened to remove the residual coolant in the water trap of the conventional water trap device; however, since the most pressure is vented through the hydrogen vent valve, the coolant is hard to be removed only by gravity. Whereas, in accordance with the water trap device of the present invention, since the coolant is forcibly removed through the coolant discharge pipe to the water trap outlet valve when the engine is shut down, the amount of the residual coolant in the water trap is very small. Accordingly, the thawing of the coolant using a hot-wire requires a lower heat load or the hot-wire for further thawing is not required, thus reducing the manufacturing cost.

As described above, the water trap device for a fuel cell vehicle in accordance with the present invention provides the advantageous effects including the following:

1) With the anode outlet line penetrating the water trap and connected to the water trap outlet valve and with the coolant discharge pipe formed to extend from the anode outlet line toward the bottom of the water trap, it is possible to simultaneously discharge hydrogen and coolant and exclude several elements such as the hydrogen vent valve, the silencer, and the moisture removal line, required in the conventional water trap device, thus reducing the manufacturing cost;

2) since the coolant is mixed with the hydrogen and discharged, the coolant absorbs the discharge noise of hydrogen and thus it is possible to reduce the discharge noise without the silencer and the ignition of discharged hydrogen.

3) since the amount of the residual coolant in the water trap is very small, the thawing of the coolant using a hot-wire requires a lower heat load or the hot-wire for further thawing is not required, thus reducing the manufacturing cost; and 4) since the conventional level sensors are not required, it is possible to prevent the performance degradation of the fuel cell stack that may be caused when the residual coolant is not removed due to a malfunction of the level sensor.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A water trap device for a fuel cell vehicle comprising:
   an anode outlet line extending from the fuel cell stack and penetrating the inside of an upper portion of the water trap;
   a water trap outlet valve connected to an end of the anode outlet line;
   a coolant outlet line extending from the fuel cell stack and connected to an upper portion of the water trap; and
   a coolant discharge pipe extending from the anode outlet line toward the bottom of the water trap, wherein hydrogen discharged from the fuel cell stack and coolant in the water trap are simultaneously discharged by using hydrogen flow velocity and pressure in the water trap.

2. The water trap device of claim 1, wherein the coolant discharge pipe has a diameter smaller than that of the anode outlet line.

* * * * *